(12) United States Patent
Achenbach et al.

(10) Patent No.: US 10,677,127 B2
(45) Date of Patent: Jun. 9, 2020

(54) METHOD FOR HEATING A CATALYTIC CONVERTER, AS WELL AS MOTOR VEHICLE HAVING A CATALYTIC CONVERTER

(71) Applicant: VOLKSWAGEN AKTIENGESELLSCHAFT, Wolfsburg (DE)

(72) Inventors: Dennis Achenbach, Hannover (DE); Falk-Christian Baron Von Ceumern-Lindenstjerna, Braunschweig (DE); Stefan Paukner, Wolfsburg (DE); Michael Manz, Langenhagen (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 35 days.

(21) Appl. No.: 15/922,168

(22) Filed: Mar. 15, 2018

(65) Prior Publication Data

US 2018/0291784 A1 Oct. 11, 2018

(30) Foreign Application Priority Data

Apr. 6, 2017 (DE) .......................... 10 2017 107 378

(51) Int. Cl.
*F01N 3/20* (2006.01)
*F01N 3/22* (2006.01)
(Continued)

(52) U.S. Cl.
CPC ........... *F01N 3/2013* (2013.01); *F01N 3/101* (2013.01); *F01N 3/225* (2013.01); *F01N 9/00* (2013.01); *F01N 3/32* (2013.01)

(58) Field of Classification Search
CPC .... F01N 13/0093; F01N 3/101; F01N 3/2013; F01N 3/225; F01N 3/30; F01N 9/00;
(Continued)

(56) References Cited

U.S. PATENT DOCUMENTS 5,647,203 A * 7/1997 Abe .................... B01D 53/9481
60/274
6,242,263 B1 * 6/2001 Faber ...................... F01N 11/00
422/94
(Continued)

FOREIGN PATENT DOCUMENTS

DE 697 09 799 T2 6/2002
DE 10 2008 058 838 A1 7/2009
(Continued)

OTHER PUBLICATIONS

Search report for German Patent Application No. 10 2017 107 378.7, dated Sep. 29, 2017.

*Primary Examiner* — Matthew T Largi
(74) *Attorney, Agent, or Firm* — Pearl Cohen Zedek Latzer Baratz LLP

(57) ABSTRACT

A method for heating an electrically heatable catalytic converter in an exhaust duct of a motor vehicle having a combustion engine. To heat the catalytic converter prior to a start of the combustion engine, the catalytic converter should already be electrically heated prior to the start of the combustion engine, and the oxygen storage capacity of the electrically heatable catalytic converter should be filled. Thus, an efficient exhaust-gas aftertreatment is made possible already at the start of the combustion engine. A further heating of the catalytic converter by a combined electrical and chemical heating takes place following an electrical preheating phase after the start of the combustion engine by the exothermic reaction of unburned fuel components on a catalytically active surface of the electrically heatable cata-
(Continued)

lytic converter. Also, a motor vehicle having a combustion engine and an exhaust system in which a method according to the present invention is implemented.

5 Claims, 4 Drawing Sheets

(51) Int. Cl.
  *F01N 3/10* (2006.01)
  *F01N 9/00* (2006.01)
  *F01N 3/32* (2006.01)
(58) Field of Classification Search
  CPC ............ F01N 2240/16; F01N 2430/06; F01N 2900/1624; F01N 3/32
  See application file for complete search history.

(56) References Cited

U.S. PATENT DOCUMENTS

| | | | | |
|---|---|---|---|---|
| 6,427,639 | B1 * | 8/2002 | Andrews | ............ B01D 53/9454 123/3 |
| 7,913,672 | B2 * | 3/2011 | Elwart | ...................... F01N 5/02 123/519 |
| 2002/0011069 | A1 * | 1/2002 | Maus | ................. B01D 53/9431 60/285 |
| 2004/0020189 | A1 * | 2/2004 | Hirooka | .................... F01N 3/22 60/284 |
| 2006/0278449 | A1 * | 12/2006 | Torre-Bueno | ............ B60K 6/46 180/65.29 |
| 2009/0133388 | A1 * | 5/2009 | Watanabe | ............. F01N 3/0807 60/286 |
| 2011/0158871 | A1 * | 6/2011 | Arnold | ................... B01J 23/464 423/212 |
| 2013/0028818 | A1 * | 1/2013 | Eckhoff | ................ F01N 3/0814 423/212 |

FOREIGN PATENT DOCUMENTS

| | | |
|---|---|---|
| DE | 10 2010 014 332 A1 | 11/2010 |
| DE | 10 2011 018 293 A1 | 12/2011 |
| WO | WO 95/05 531 A1 | 2/1995 |

* cited by examiner

METHOD FOR HEATING A CATALYTIC CONVERTER, AS WELL AS MOTOR VEHICLE HAVING A CATALYTIC CONVERTER

CROSS-REFERENCE TO RELATED APPLICATIONS

This application claims priority from German Patent Application No. 10 2017 107 378.7, filed Apr. 6, 2017, which is incorporated herein by reference.

FIELD OF THE INVENTION

The present invention relates to a method for heating a catalytic converter in the exhaust system of a motor vehicle, as well as to a motor vehicle having a catalytic converter mounted in the exhaust system.

BACKGROUND OF THE INVENTION

To meet the increasingly stringent demands of exhaust emissions legislation, vehicle manufacturers are taking appropriate measures to reduce untreated engine emissions and are providing suitable exhaust-gas aftertreatments. To effectively convert the inevitable untreated emissions in a post-engine process, catalytic converters coated with precious metal are installed in the exhaust system of the combustion engine. These catalytic converters and the exhaust gas must be at a minimum temperature level in order to convert the pollutants. Engine-related heating measures, such as retarding the ignition timing or operating the combustion engine substoichiometrically while simultaneously introducing secondary air, are used to bring the catalytic converter to an operating temperature as rapidly as possible following a cold start of the combustion engine. Electrical heating may be employed to rapidly and selectively heat the catalytic converter. Emissions may thereby be significantly reduced even in the cold-start phase.

Moreover, with the introduction of the EU6 stage legislation for gasoline engines, a limit value for a particle count has been mandated that, in many cases, necessitates the use of a gasoline particulate filter. Such a gasoline particulate filter is loaded with soot during vehicle operation. This gasoline particulate filter must be continuously or periodically regenerated to prevent an excessive increase in the exhaust gas back pressure. A high enough temperature level in conjunction with simultaneously present oxygen in the exhaust system of the gasoline engine is needed to thermally oxidize the soot retained in the gasoline particulate filter. This requires additional measures since today's gasoline engines are normally operated without excess oxygen at a stoichiometric air/fuel ratio ($\lambda=1$). Possible measures include increasing the temperature by adjusting the ignition timing, temporarily adjusting the gasoline engine toward lean, injecting secondary air into the exhaust system, for example, or a combination thereof. Until now, an ignition-timing retard has preferably been used in combination with an adjustment of the gasoline engine toward lean since this method does not require additional components and is able to supply a sufficient quantity of oxygen in most operating points of the gasoline engine.

The German Patent Application DE 10 2010 014 332 A1 discusses a method for thermally managing the exhaust system of a motor vehicle having a hybrid drive made up of a combustion engine and an electric motor. In this approach, the catalytic converter is initially electrically preheated with the aid of an electrically heatable catalytic converter and an injection of air, and then chemically heated by a combination of air injection into the exhaust duct and richness adjustment of the air-fuel mixture in the combustion engine. However, the disadvantage of such a method is the separation between the electrically heated catalytic converter and another catalytic converter that is to be heated and is to play a decisive role in transforming the pollutants.

The German Patent Application DE 10 2011 018 293 A1 describes a hybrid vehicle having a combustion engine and an electric motor, an electrically heatable catalytic converter and a second catalytic converter being mounted in the exhaust system. The electrically heatable catalytic converter is thereby used in a starting phase of the combustion engine to convert the harmful exhaust-gas components until the three-way catalytic converter reaches the light-off temperature thereof and is able to efficiently transform the exhaust-gas components.

From the World Patent Application WO 95/05531 A1, a combustion engine having an exhaust system is known where, in the first instance, an electrically heatable catalytic converter is configured downstream of an exhaust of the combustion engine, and a further three-way catalytic converter is configured downstream of the electrically heatable catalytic converter. The electrically heatable catalytic converter is thereby used, in fact, as a starter catalytic converter. To equalize the enrichment customarily present upon a cold starting of the combustion engine in order to improve the ignitability of the combustion mixture in the cold combustion chambers of the combustion engine, secondary air is injected into the exhaust duct upstream of the electrically heatable catalytic converter. The purpose is to facilitate the heating of the electrically heatable catalytic converter and to enhance an exhaust-gas aftertreatment.

SUMMARY OF THE INVENTION

It is, therefore, an object of the present invention to further improve the emissions in a cold-start phase of the combustion engine and especially to further reduce the same during the heating phase of the catalytic converters.

This objective is achieved in accordance with the present invention by a method for heating an electrically heatable catalytic converter in an exhaust system of a combustion engine, the electrically heatable catalytic converter having an electrical heating element and a catalytically active surface area, and the electrical heating element being controllable by a control unit, including the following steps:

electrically heating the electrically heatable catalytic converter prior to a start of the combustion engine;

introducing fresh air into the electrically heatable catalytic converter during the heating thereof and prior to the start of the combustion engine;

filling an oxygen accumulator of the electrically heatable catalytic converter with oxygen as soon as a temperature threshold is exceeded;

starting the combustion engine;

electrically heating the electrically heatable catalytic converter and simultaneously heating the engine-proximate catalytic converter through application of internal engine measures to the combustion engine;

operating the combustion engine at a substoichiometric air/fuel ratio, so that unburned or partially burned fuel components on the catalytically active surface of the electrically heatable catalytic converter are exothermically reacted with the oxygen stored in the oxygen accumulator of the electrically heatable catalytic converter;

operating the combustion engine at a stoichiometric air/fuel ratio when the oxygen accumulator of the electrically heatable catalytic converter has reached a minimally permissible fill level.

The method according to the present invention makes it possible to heat a catalytic converter in an exhaust system of a combustion engine to a temperature at which it already significantly converts pollutants. The electrical heating allows the catalytic converter to reach a temperature at which the catalytically active surface promotes a chemical reaction of the unburned or partially burned fuel components, even before the engine is started. By combining electrical and chemical heating of the catalytic converter, internal engine modifications may enable the heat to be utilized to completely heat through the catalytic converter. In fact, in conjunction with a substoichiometric air/fuel ratio, the oxygen stored in the oxygen accumulator of the electrically heatable catalytic converter makes it possible for the unburned hydrocarbons on the catalytically active surface of the electrically heatable catalytic converter to be exothermically reacted upon starting of the engine. The measure described above makes it possible to reach a light-off temperature of the catalytic converter more quickly and to shorten the heating phase thereof. The increase in fuel consumption may be thereby reduced by the shortened chemical heating phase and the cold-start emissions diminished. In this connection, a chemical heating phase of the catalytic converter is to be understood as a measure whereby heat is generated by an exothermic chemical reaction, especially by the reaction of unburned or partially burned fuel components with oxygen on the catalytically active surface of the electrically heatable catalytic converter.

Advantageous improvements to and refinements of the method indicated in the independent claim for heating an electrically heatable catalytic converter are rendered possible by the measures delineated in the dependent claims.

A preferred embodiment of the present invention provides that the introduction of oxygen-rich fresh air into the electrically heatable catalytic converter be stopped upon starting of the combustion engine. A lambda control of the combustion engine is thereby still possible.

An enhancement of the inventive method for heating an electrically heatable catalytic converter provides that it be initiated by a start signal which makes it seem likely that the combustion engine will immediately start in response thereto. A cold starting of the combustion engine is typically preceded by the driver entering into the motor vehicle and fastening his/her seat belt. Even before the combustion engine is started, sensors already present in the motor vehicle may be utilized to initiate the electrical heating in response to a start signal initiated by a door switch, a receiver for a transmitter of a keyless go system, or a central locking system, or a seat-belt contact. A door switch and the receiver for the signal from a locking system are especially preferred since, in this case, the time interval between opening or releasing the door and starting the combustion engine is comparatively long, and the electrically heatable catalytic converter is thus able to be effectively heated within this time interval.

It is especially thereby preferred when the start signal is initiated by an opening or closing of a door switch, by a sensor for detecting seat occupancy, or by a seat-belt buckle sensor. Sensors having an electromechanical component are preferably used that may be very readily and reliably designed.

Alternatively or additionally, it is advantageously provided that the start signal be initiated by a receiver for a keyless entry system, by a GPS receiver, or by a signal from an engine control unit of a hybrid drive. Electrical signals may be thereby evaluated without the need for additional sensors. In the case of a hybrid vehicle, it is provided, namely, that the state of charge (SOC) of the vehicle battery initiate the process in response to its falling below a defined threshold value, and that activation of the combustion engine be assumed to be likely for the vehicle to reach the destination thereof.

In accordance with the present invention, a motor vehicle having a combustion engine that is coupled by the exhaust thereof to an exhaust system features downstream of the exhaust, a first engine-proximate three-way catalytic converter or an engine-proximate four-way catalytic converter and, downstream of the first three-way catalytic converter or the four-way catalytic converter, an electrically heatable catalytic converter being configured in the exhaust system; and the motor vehicle having a control unit that is adapted for implementing a method according to the present invention when a machine-readable program code is executed on the control unit. It is a feature of a motor vehicle according to the present invention that, during a cold start of the combustion engine or a restart thereof, following a relatively long interruption of operation, that it have especially low tailpipe emissions and that it be able to convert the occurring harmful exhaust-gas components into harmless components beginning from the start of the combustion engine. In this connection, an engine-proximate configuration is understood to connote that the three-way catalytic converter is located less than 60 cm, preferably less than 40 cm from an exhaust of the combustion engine.

The features delineated in the dependent claims render possible further improvements and advantageous refinements of the motor vehicle according to the present invention.

A preferred embodiment of the present invention provides that a feed point of a secondary air system be configured downstream of the first three-way catalytic converter or of the four-way catalytic converter and upstream of the electrically heatable catalytic converter. Fresh air is introducible via the feed point into the exhaust duct of the exhaust system upstream of the electrically heatable catalytic converter. Introducing secondary air via a secondary air system into the exhaust duct of the motor vehicle obviates the need for introducing the same in a trailing throttle operation of the combustion engine. In trailing throttle operation, the combustion engine may not be lubricated at all or may only be insufficiently lubricated. Therefore, in other respects, such a trailing throttle operation leads to increased wear that may be prevented through the use of a secondary air system. Moreover, in terms of energy usage, trailing throttle operation of the combustion engine to introduce secondary air is much less favorable than driving a comparatively simple and lightweight secondary air pump.

Another advantageous embodiment of the present invention provides that the electrically heatable catalytic converter have an electrical heating disk disposed upstream of the monolith of the electrically heatable catalytic converter. An electrical heating disk may be used to electrically heat an economical three-way catalytic converter, and all that is needed is a slight modification to the monolith. This requires that there be an adequate transfer of heat from the heating disk to the monolith of the electrically heatable catalytic converter. This heat transfer may be facilitated by the injected secondary air and a flow in the exhaust duct associated therewith. Thus, the costs for the additional components of the exhaust system may be kept to a minimum.

Alternatively, it is advantageously provided that the electrically heatable catalytic converter include an electrically conductive and directly heatable, catalytically active monolith. A directly heatable monolith obviates the need for an additional heat transfer from a heating element to the catalytic converter, making it possible even without a gas flow in the exhaust duct and enabling a complete and uniform heating of the electrically heatable catalytic converter.

A preferred specific embodiment of the present invention provides that the motor vehicle be a hybrid vehicle having a combustion engine and an electric drive motor. The method according to the present invention is especially useful for reducing the emissions of hybrid vehicles since a hybrid vehicle, in particular, often has operating states in which the combustion engine stands still and which are associated with a cooling of the exhaust system and of the catalytic converters mounted therein.

In the case of an autonomous or partially autonomous vehicle, the electrical heating of the electrically heatable catalytic converter may also be initiated in response to a drive command prompt, the combustion engine only starting when the electrically heatable catalytic converter has reached a first threshold temperature.

Unless indicated otherwise in the individual case, the various specific embodiments of the present invention mentioned in this Application may be advantageously combined with one another.

BRIEF DESCRIPTION OF THE DRAWINGS

The present invention will be explained in the following in the light of exemplary embodiments with reference to the accompanying drawings. Identical components or components having the same function are thereby characterized by the same reference numerals in the drawing in question, in which.

DETAILED DESCRIPTION OF THE INVENTION

Figure 1:
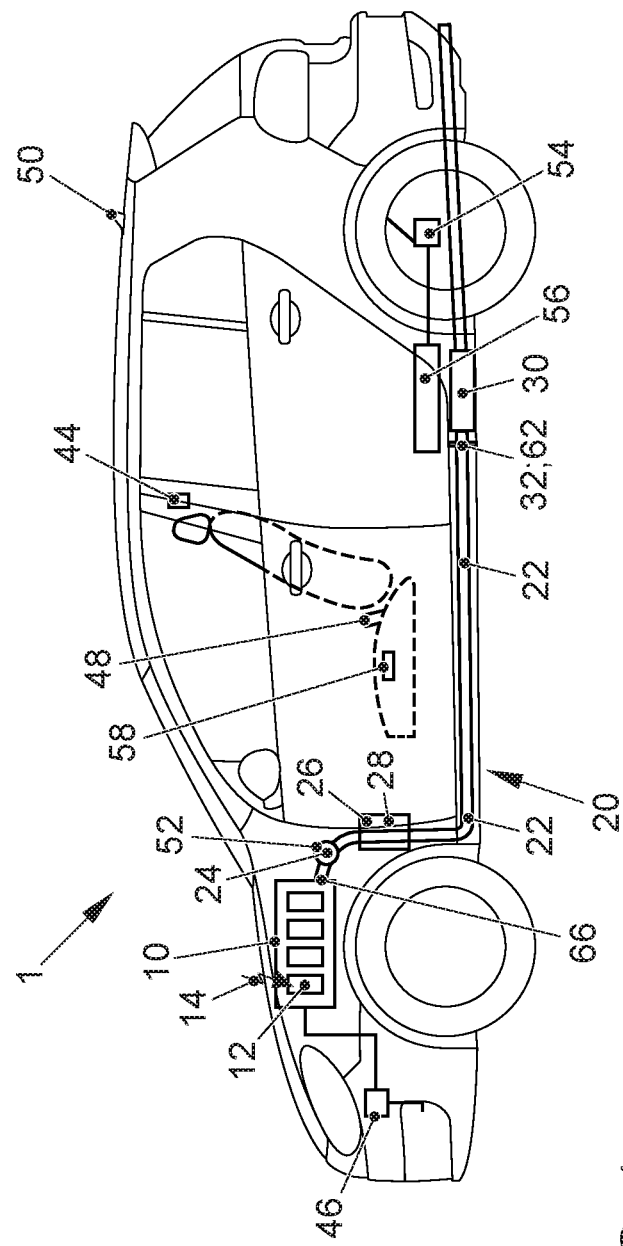
FIG. 1 shows a preferred design variant of a drive system of a motor vehicle according to the present invention.

FIG. 1 shows a first exemplary embodiment of a motor vehicle 1 according to the present invention having a combustion engine 10 and an exhaust system 20. Motor vehicle 1 according to the present invention is preferably in the form of a hybrid vehicle 2 having a combustion engine 10 and an electric motor 56, especially having a gasoline engine that is spark-ignited by spark plugs 14. Combustion engine 10 has at least one combustion chamber 12, preferably four combustion chambers 12, as shown in FIG. 1, that are coupled by a shared exhaust 66 to an exhaust duct 22 of exhaust system 20.

Exhaust system 20 features a turbine 24 of an exhaust-gas turbocharger 52 in the flow direction of an exhaust gas through exhaust duct 22 of the exhaust system. Mounted downstream of turbine 24 in exhaust duct 22 is an engine-proximate three-way catalytic converter 26 or an engine proximate four-way catalytic converter 28. Mounted downstream of three-way catalytic converter 26 or of four-way catalytic converter 28 in the underfloor location of the motor vehicle is an electrically heatable catalytic converter 30. As an electrically heatable three-way catalytic converter, electrically heatable catalytic converter 30 is designed to include a heating element 32, specifically a heating disk 62, disposed upstream of the auxiliary catalytic converter (three-way catalytic converter) in the flow direction of the exhaust gas through exhaust duct 22. Alternatively, electrically heatable catalytic converter 30 may also feature an electrically conductive and directly heatable monolith 34.

In response to an application of an electric voltage, electrically heatable monolith 34 thereby acts as a heating resistor and thus as an electrical heating element 32. Electrical heating element 32 of electrically heatable catalytic converter 30 is controllable by a control unit 42, preferably by the engine control unit of combustion engine 10 or a power controller of hybrid vehicle 2. Electric drive motor 54 of hybrid vehicle 2 is supplied with voltage via a battery 56 that may also be used for heating electrical heating element 32.

Figure 2:
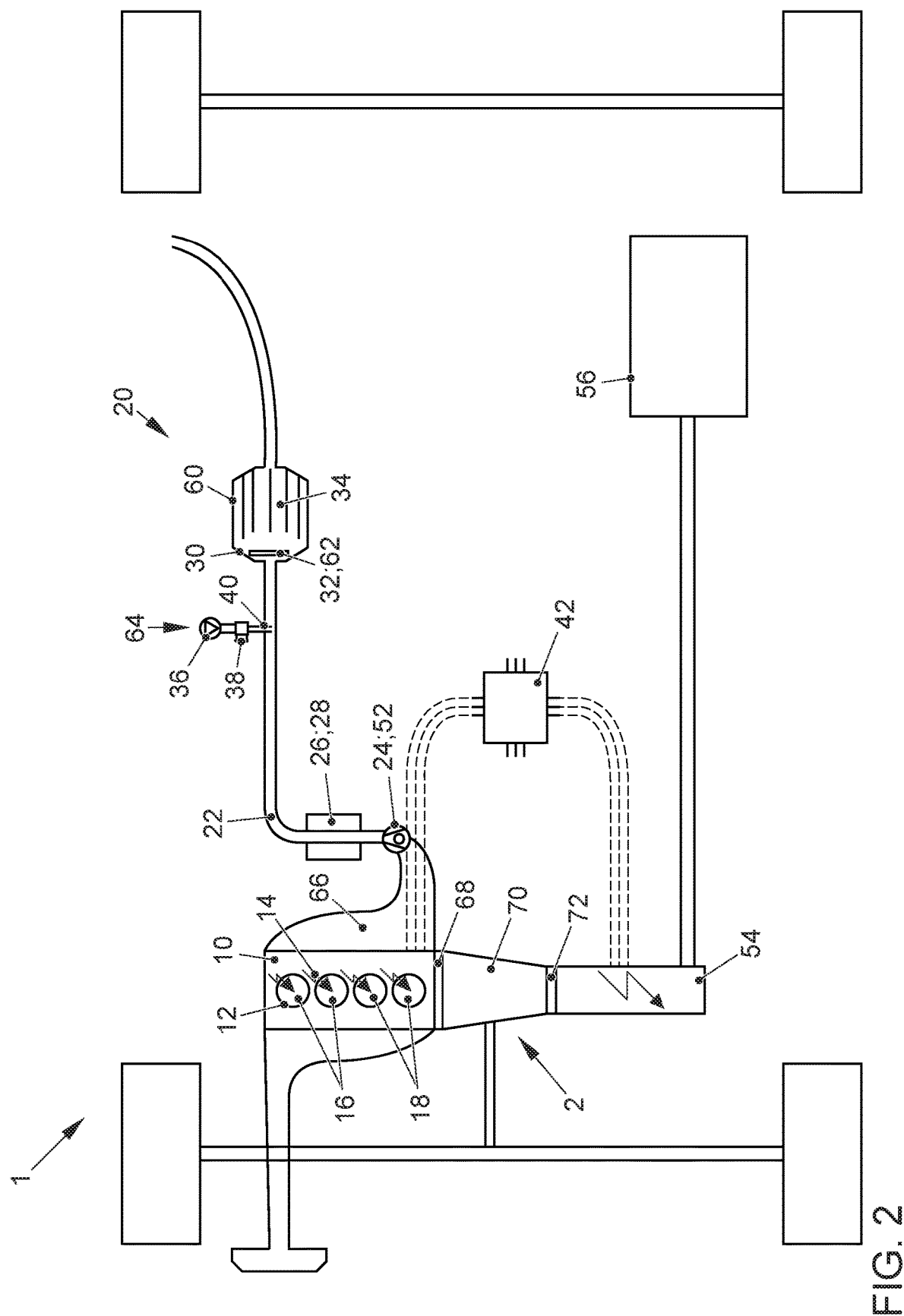
FIG. 2 is a schematic representation of a drivetrain of a motor vehicle according to the present invention that is in the form of a hybrid vehicle.

As shown in FIG. 2, combustion chambers 12 of combustion engine 10 may be divided into a first group of combustion chambers 16 and a second group of combustion chambers 18, both groups 16, 18 preferably having the same number of combustion chambers 12. In the case of combustion engine 10 shown in FIG. 2, both groups 16, 18 each have two combustion chambers 12. Combustion engine 10 is preferably designed as a reciprocating engine, but may also be designed as a rotary piston engine. Combustion engine 10 is preferably adapted for being charged by an exhaust-gas turbocharger 52. Alternatively, however, it may also be designed as an induction engine.

Motor vehicle 1 has a door switch 44, a receiver for a keyless entry system 46, especially a receiver for a radio remote control or a keyless go system, a seat-belt buckle sensor 48, a GPS receiver 50 and/or a sensor for detecting seat occupancy 58. Electric drive motor 54 may drive the same drive axle as combustion engine 10; alternatively, electric drive motor 54 may also drive the other drive axle of the motor vehicle independently of combustion engine 10. Motor vehicle 1 may also be designed to have a conventional drive that exclusively features a combustion engine 10.

FIG. 2 shows the drivetrain of a hybrid vehicle 2 having a combustion engine 10 and an electric drive motor 54. Combustion engine 10 is thereby coupled by a first clutch 68, and electric drive motor 54 by a second clutch 72 to a transmission 70 of hybrid vehicle 2. Combustion engine 10 has a plurality of combustion chambers 12, each having a spark plug 14 disposed thereon. Combustion engine 10 is coupled by exhaust 66 thereof to an exhaust system 20 in which an engine-proximate first three-way catalytic converter 26 is configured in the flow direction of the exhaust gas of combustion engine 10 through the exhaust system, as is an electrically heatable three-way catalytic converter 30 downstream of first three-way catalytic converter 26 in the underfloor location of hybrid vehicle 2.

Electrically heatable three-way catalytic converter 30 has a heating element 32, preferably a heating disk 62 as shown in FIG. 2 that is configured upstream of monolith 34 of electrically heatable catalytic converter 30. Monolith 34 and the heating disk have a catalytically active coating 60 which makes it possible for the pollutants in the exhaust gas of combustion engine 10 to be converted into harmless exhaust gas components. Provided on exhaust duct 22 downstream of first three-way catalytic converter 26 and upstream of electrically heatable three-way catalytic converter 30 is a secondary air system 64 which includes a secondary air pump 36, a secondary air valve 38, and a feed point 40, namely an orifice. The orifice may be used to additionally influence the direction and rate of the secondary air discharge into exhaust duct 22 to provide an enhanced flow onto electrically heatable catalytic converter 30. In place of an engine-proximate three-way catalytic converter 26, a particulate filter having a three-way catalytically active coating, what is generally referred to as a four-way catalytic converter 28, may also be configured in exhaust system 20.

Figure 3:
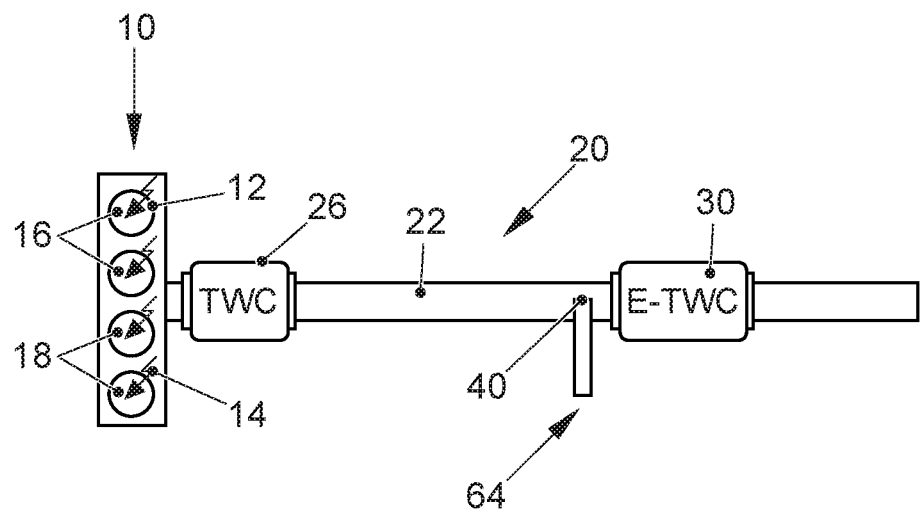
FIG. 3 is a schematic representation of a combustion engine for a motor vehicle according to the present invention whose exhaust is coupled to an exhaust system that makes possible a method according to the present invention.

FIG. 3 shows a combustion engine 10 having an exhaust system 20. Combustion engine 10 preferably has four combustion chambers 12 that may be subdivided into a first group of combustion chambers 16 and a second group of combustion chambers 18. Combustion engine 10 is designed to be spark-ignited by spark plugs 14. A three-way catalytic converter 26 is mounted in exhaust system 20 proximately to the engine. Mounted downstream thereof, especially in the underfloor location of motor vehicle 1, is an electrically heatable three-way catalytic converter 30.

To fill the oxygen accumulator (OSC) of electrically heatable catalytic converter 30 prior to start S of combustion engine 10 and to facilitate the electrical heating of the electrically heatable three-way catalytic converter 30 in the start phase by an exothermic reaction of exhaust gas components, a feed point 40 is provided on exhaust duct 22 of exhaust system 20 that allows secondary air to be introduced into exhaust duct 22 and oxygen accumulator OSC of electrically heatable catalytic converter 30 to be filled.

Figure 4:
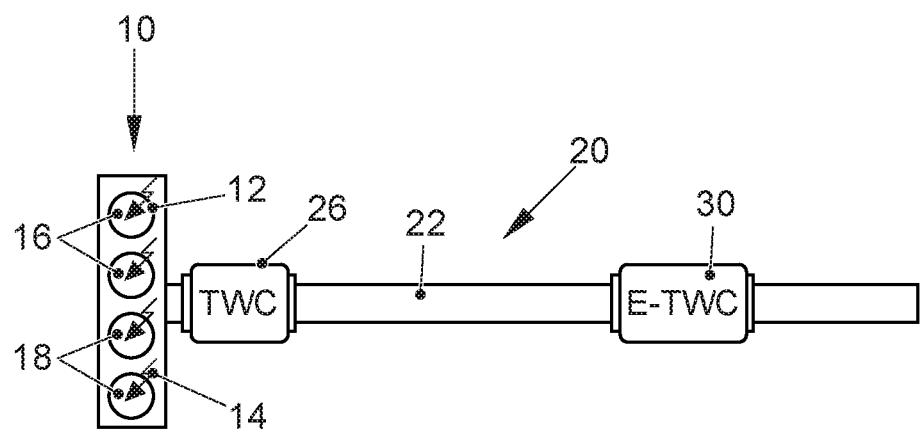
FIG. 4 is a schematic representation of an alternative exemplary embodiment of an exhaust system that is connected to an exhaust of a combustion engine and that makes possible a method according to the present invention.

FIG. 4 shows an alternative exemplary embodiment of a combustion engine 10 having an exhaust system 20 for a motor vehicle 1. Motor vehicle 1 is thereby in the form of a hybrid vehicle 2; electric drive motor 54 being able to operate combustion engine 10 at a standstill in a trailing throttle condition and, in this manner, deliver oxygen-rich fresh air into exhaust duct 22. For that reason, the need for a secondary air system 64 is eliminated in this exemplary embodiment when the design is the same as in FIG. 3 in other respects.

Figure 5:
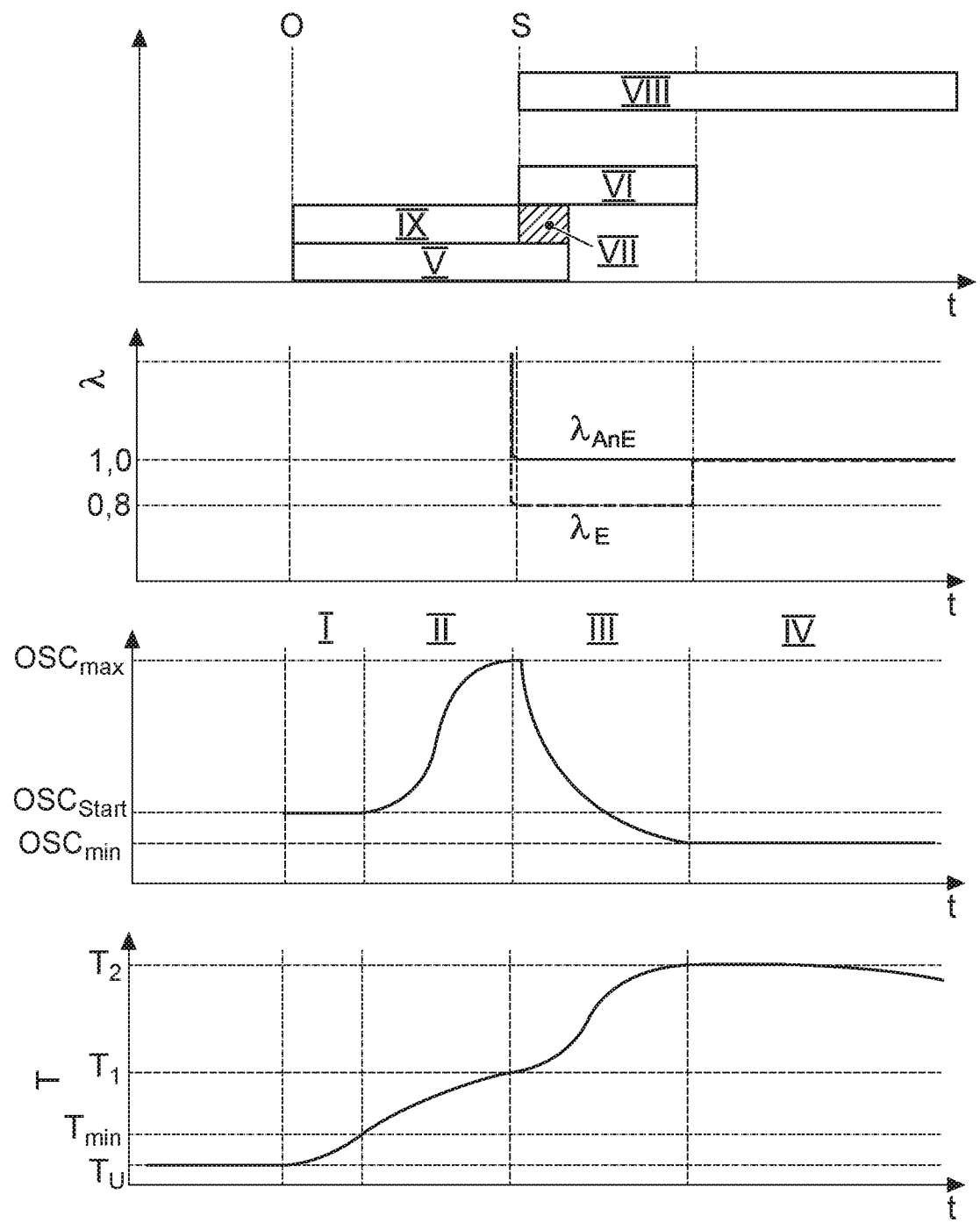
FIG. 5 is a process diagram for implementing a method according to the present invention for heating an electrically heatable catalytic converter in an exhaust system of a combustion engine.

FIG. 5 shows the functional sequence of a method according to the present invention for heating an electrically heatable catalytic converter 30 in an exhaust system 20 of a combustion engine 10. In a first method step I, starting at a point in time 0, electrically heatable catalytic converter 30 is heated with the aid of secondary air prior to start S of combustion engine 10. The electrical heating of electrically heatable catalytic converter 30 is thereby initiated by a start signal which makes an immediate start S of combustion engine 10 in response thereto seem likely. The start signal may thereby be initiated by an opening or closing of a door switch 44, by a sensor for detecting seat occupancy 58, by a seat-belt buckle sensor 48, by a GPS signal from GPS receiver 50, by a receiver for a keyless entry system 46, and/or by a signal from a control unit 42, preferably by control unit 42 of a hybrid vehicle 2, especially in response to a state of charge=SOC of battery 56 of electric drive motor 54 not being met.

Above a certain temperature (II), the oxygen accumulator (OSC) of electrically heatable catalytic converter 30 is filled by the secondary air introduced into exhaust duct 22. The secondary air is preferably thereby introduced by a secondary air system 64 into exhaust duct 22, but, in the case of a hybrid vehicle 2, may also be introduced into exhaust duct 22 by operating combustion engine 10 in trailing throttle condition. Oxygen accumulator OSC of electrically heatable catalytic converter 30 is filled from an initial level $OSC_{start}$ to a maximum capacity $OSC_{max}$ thereof.

In a third method step III, the introduction IX of secondary air is stopped, and combustion engine 10 is started in response to electrically heatable catalytic converter 30 reaching a first threshold temperature $T_1$, and the oxygen accumulator of the electrically heatable catalytic converter essentially being completely filled. Combustion engine 10 is thereby operated at a sub stoichiometric air/fuel ratio $\lambda_E<1$; the unburned fuel components in exhaust duct 22 being exothermically reacted with the oxygen stored in electrically heatable catalytic converter 30, and the electrical heating of catalytic converter V being facilitated by an additional chemical heating of catalytic converter VI. Oxygen accumulator OSC of electrically heatable catalytic converter 30 is thereby discharged to a minimally permissible fill level $OSC_{min}$. Downstream of electrically heatable catalytic converter 30, a stoichiometric exhaust gas air ratio $\lambda_{AnE}=1$ is reached.

In a fourth phase of the inventive method following the third phase, combustion engine 10 is operated in a stoichiometric air/fuel ratio $\lambda_E=1$ once a second threshold temperature $T_2$ of electrically heatable catalytic converter 30 is reached in a normal operation, whereby first three-way catalytic converter 26 and electrically heatable three-way catalytic converter 30 convert the limited pollutant components into unlimited and harmless exhaust gas components.

LIST OF REFERENCE NUMERALS 1 motor vehicle
2 hybrid vehicle
10 combustion engine
12 combustion chamber
14 spark plug
16 first group of combustion chambers
18 second group of combustion chambers
20 exhaust system
22 exhaust duct
24 turbine
26 first three-way catalytic converter
28 four-way catalytic converter
30 electrically heatable catalytic converter
32 heating element
34 heatable monolith
36 secondary air pump
38 secondary air valve
40 feed point
42 control unit
44 door switch
46 receiver for keyless entry system
48 seat-belt buckle sensor
50 GPS receiver
52 turbocharger 54 electric drive motor
56 battery
58 sensor for detecting seat occupancy
60 catalytic surface
62 heating disk
64 secondary air system
66 exhaust
68 first clutch
70 transmission
72 second clutch
T temperature
$T_U$ ambient temperature
$T_{min}$ temperature upstream of the three-way catalytic converter
$T_1$ first threshold temperature
$T_2$ second threshold temperature
$\lambda_E$ air/fuel ratio
$\lambda_{AnE}$ exhaust gas air ratio downstream of the electrically heatable catalytic converter
O start of the electrical heating of the catalytic converter
S start of the combustion engine
I first phase
II second phase
III third phase
IV fourth phase
V electrical heating of the catalytic converter
VI chemical heating of the catalytic converter
VII parallel electrical and chemical heating of the catalytic converter
VIII operation of the combustion engine
IX secondary air active/combustion engine in trailing throttle operation
OSC oxygen storage capacity
$OSC_{min}$ minimum filling of the oxygen accumulator
$OSC_{max}$ maximum storage capacity of the oxygen accumulator
$OSC_{start}$ exemplary fill level at the beginning of the process
t time

The invention claimed is:

1. A method for heating an electrically heatable catalytic converter in an exhaust system of a combustion engine, the electrically heatable catalytic converter having an electrical heating element and a catalytically active surface area, and the electrical heating element being controllable by a control unit, comprising the following steps:
   electrically heating the electrically heatable catalytic converter prior to a start of the combustion engine;
   introducing fresh air into the electrically heatable catalytic converter during the heating of the electrically heatable catalytic converter and prior to the start of the combustion engine, an oxygen accumulator of the electrically heatable catalytic converter being filled with oxygen;
   starting the combustion engine;
   heating the electrically heatable catalytic converter by electrical heating, as well as simultaneously by internal engine measures of the combustion engine, the combustion engine being operated at a substoichiometric air/fuel ratio ($\lambda_E<1$), so that unburned or partially burned fuel components on the catalytically active surface of the electrically heatable catalytic converter are exothermically reacted with the oxygen stored in the oxygen accumulator of the electrically heatable catalytic converter; and
   operating the combustion engine at a stoichiometric air/fuel ratio ($\lambda_E=1$) when the oxygen accumulator of the electrically heatable catalytic converter has reached a minimally permissible fill level.

2. The method as recited in claim 1, wherein the introduction of fresh air into the electrically heatable catalytic converter is stopped upon the starting of the combustion engine.

3. The method as recited in claim 1, wherein the method is initiated by a start signal in which an immediate start of the combustion engine in response to the start signal will occur.

4. The method as recited in claim 3, wherein the start signal is initiated by an opening or closing of a door switch, by a sensor for detecting the seat occupancy, or by a seat-belt buckle sensor.

5. The method as recited in claim 3, wherein the start signal is initiated by a receiver for a keyless entry system, by a GPS receiver, or by a signal from an engine control unit of a hybrid drive.

* * * * *